(12) United States Patent
Mesecher (10) Patent No.: US 8,417,207 B2
(45) Date of Patent: Apr. 9, 2013

(54) HIGH-PERFORMANCE CELLULAR TELEPHONE RECEIVER

(75) Inventor: David K. Mesecher, Melville, NY (US)

(73) Assignee: Northrop Grumman Systems Corporation, Falls Church, VA (US)

(*) Notice: Subject to any disclaimer, the term of this patent is extended or adjusted under 35 U.S.C. 154(b) by 0 days.

(21) Appl. No.: 13/456,387

(22) Filed: Apr. 26, 2012

(65) Prior Publication Data

US 2012/0208567 A1 Aug. 16, 2012

Related U.S. Application Data

(62) Division of application No. 12/645,683, filed on Dec. 23, 2009, now Pat. No. 8,195,241.

(51) Int. Cl.
*H04B 1/10* (2006.01)
(52) U.S. Cl. .... 455/296; 455/501; 455/63.1; 455/562.1; 455/570; 375/316; 375/346
(58) Field of Classification Search ........... 455/501, 455/63.1, 130, 168.1, 562.1, 570, 278.1, 455/296; 375/316, 346
See application file for complete search history.

(56) References Cited

U.S. PATENT DOCUMENTS

| | | | |
|---|---|---|---|
| 5,553,062 A | 9/1996 | Schilling et al. | |
| 6,157,685 A | 12/2000 | Tanaka et al. | |
| 6,222,498 B1 | 4/2001 | Ishii et al. | |
| 6,282,233 B1 | 8/2001 | Yoshida | |
| 6,584,115 B1 | 6/2003 | Suzuki | |
| 6,600,729 B1 | 7/2003 | Suzuki | |
| 6,614,766 B1 | 9/2003 | Seki et al. | |
| 6,771,986 B1 | 8/2004 | Oh | |
| 6,825,808 B2 | 11/2004 | Kimata et al. | |
| 6,944,208 B2 | 9/2005 | Miyoshi et al. | |
| 7,075,972 B2 | 7/2006 | Horng et al. | |
| 7,145,942 B1 | 12/2006 | Ogawa et al. | |
| 7,203,178 B2 | 4/2007 | Ishii et al. | |
| 7,336,698 B2 | 2/2008 | Nuutinen et al. | |
| 2005/0261028 A1* | 11/2005 | Chitrapu | 455/562.1 |
| 2006/0223483 A1 | 10/2006 | Behzad | |
| 2007/0207760 A1 | 9/2007 | Kavadia et al. | |
| 2007/0210974 A1* | 9/2007 | Chiang | 343/757 |
| 2008/0139124 A1* | 6/2008 | Tillotson | 455/63.4 |
| 2009/0088124 A1 | 4/2009 | Schuur et al. | |

* cited by examiner

*Primary Examiner* — Tuan Pham
(74) *Attorney, Agent, or Firm* — Robert P. Lenart, Esq.; Pietragallo Gordon Alfano Bosick & Raspanti, LLP (57) ABSTRACT

A method includes: receiving a reference signal on an array of antenna elements; using a received reference signal to find optimal weighting of the antenna elements to point a beam pattern of the antenna elements in the direction of a reference signal, thereby providing gain in the direction of the reference signal and attenuation in all other directions; adjusting a width of the beam pattern to cover an area of interest; acquiring and tracking interferers in the area of interest; reconstructing a component of interference from each of the interferers; and using the reconstructed component of interference to adaptively cancel interference from the interferers.

12 Claims, 9 Drawing Sheets

HIGH-PERFORMANCE CELLULAR TELEPHONE RECEIVER

CROSS-REFERENCE TO A RELATED APPLICATION

This application is a divisional application of U.S. patent application Ser. No. 12/645,683, filed Dec. 23, 2009, which is hereby incorporated by reference.

FIELD OF THE INVENTION

This invention relates to cellular telephone receivers, and more particularly to such receivers that include a beam steering feature.

BACKGROUND OF THE INVENTION

In a cellular telephone system, it would be advantageous to increase the operating range of the receivers with respect to the base stations. One known approach uses beam steering at the base station, but does not take advantage of reference or pilot signals emanating from the base station of interest.

It would be desirable to provide an alternative to the previously known methods of beam steering in cellular telephones.

SUMMARY OF THE INVENTION

In a first aspect, the invention provides a method including: receiving a reference signal on an array of antenna elements; using a received reference signal to find optimal weighting of the antenna elements to point a beam pattern of the antenna elements in the direction of a reference signal, thereby providing gain in the direction of the reference signal and attenuation in all other directions; adjusting a width of the beam pattern to cover an area of interest; acquiring and tracking interferers in the area of interest; reconstructing a component of interference from each of the interferers; and using the reconstructed component of interference to adaptively cancel interference from the interferers.

In another aspect, the invention provides a receiver including an array of antenna elements for receiving a reference signal; and processing circuitry for using the received reference signal to find optimal weighting of the antenna elements to point a beam pattern of the antenna elements in the direction of a reference signal, thereby providing gain in the direction of the reference signal and attenuation in all other directions; for adjusting a width of the beam pattern to cover an area of interest; for acquiring and tracking interferers in the area of interest; for reconstructing a component of interference from each of the interferers; and for using the reconstructed component of interference to adaptively cancel interference from the interferers.

DETAILED DESCRIPTION

In one aspect, this invention relates to wireless communications systems that include base stations and hand-held cellular telephones and/or other user equipment. In operation, commercial digital wireless communications waveforms emitted by the base stations, including Time Division Multiple Access (TDMA), Code Division Multiple Access (CDMA), and frequency-hopped waveforms, include some type of training bit or reference symbol sequence that is used by a receiver to enable signal acquisition, drive tracking algorithms, and provide an absolute phase reference for phase locked loops and channel estimation algorithms. This training sequence could be a dedicated "pilot" channel, or training bits embedded in the traffic channel. This same training sequence, or pilot signal, can be used as a reference signal in an adaptive process to find the optimal antenna weighting of an array of receive antenna elements, thereby automatically forming an array response pattern with a beam pointed in the direction of the base station of interest, and its associated users. This spatial response will provide gain in the direction of a cell of interest, which will increase the received signal strength of signals of interest within the cell of interest, and mitigate interference from cellular transmitters outside the cell of interest.

Figure 1:
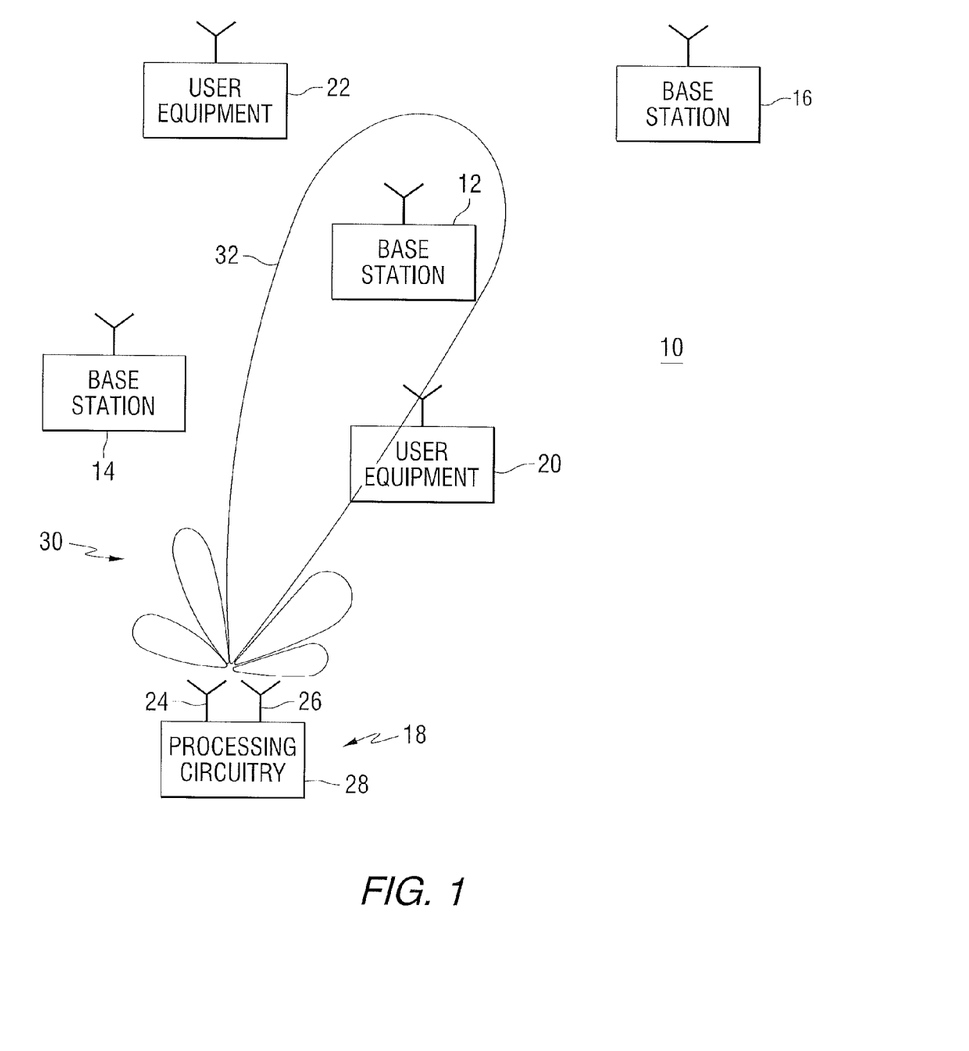
FIG. 1 is a schematic representation of a cellular telephone system including a receiver constructed in accordance with an embodiment of the invention.

One approach utilizes beam steering in which a beam pattern of an array of antenna elements at the receiver is adjusted to direct the beam toward a base station. FIG. 1 is a schematic representation of a cellular telephone system 10 that includes base stations 12, 14 and 16 including transmitters, and conventional user equipment 18, 20 and 22. A high-performance cellular receiver 18 is constructed in accordance with an embodiment of the invention and includes at least two antenna elements 24, 26 in an array of antenna elements. The antenna elements 24, 26 are used for receiving signals from a base station, as well as from conventional user equipment located within the cell of interest. Reference signals received by the antenna elements from the base station and user equipment within the cell of interest are processed in the receiver processing circuitry 28 and used to adjust weights which are assigned to the antenna elements that control the beam pattern 30 of the antenna array. For example, if base station 12 emits the reference signal, the main lobe 32 of the beam pattern can be steered toward the transmitter, thereby increasing the sensitivity of the receiver to signals emitting from the transmitter of base station 12.

This invention takes advantage of the reference or pilot signals emanating from the base station of the cell of interest to perform adaptive beamforming at the receiver, and to thereby improve the quality of signals received from the base station and user equipment within the cell. Reference signals from user equipment within the cell of interest can also be exploited in a similar fashion if beam steering in the direction of a particular user is desirable in order to obtain an improved signal-to-noise-plus-interference ratio (SNIR) on that particular user.

Figure 7:
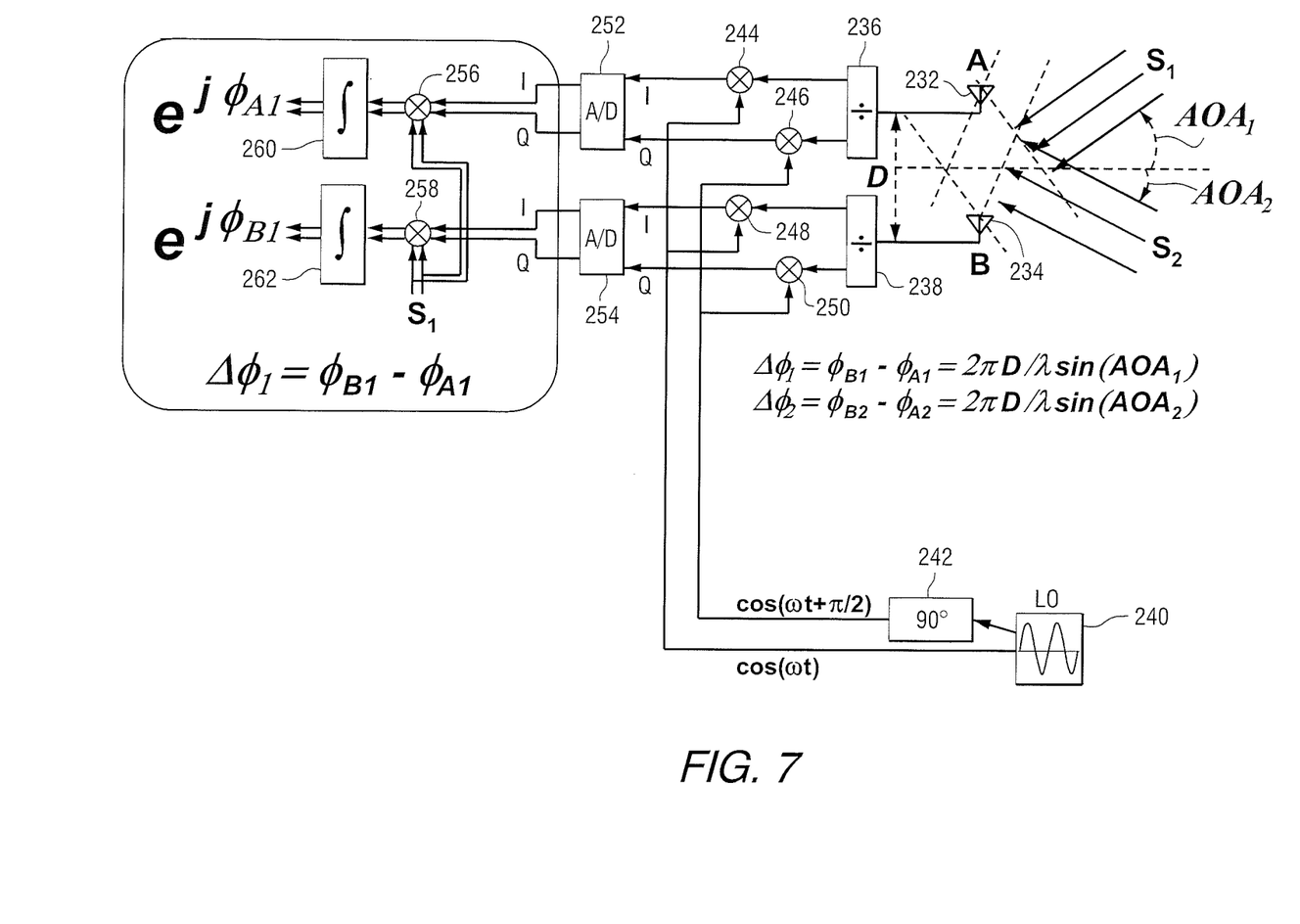
FIG. 7 is a block diagram illustrating active interferometry.
Figure 8:
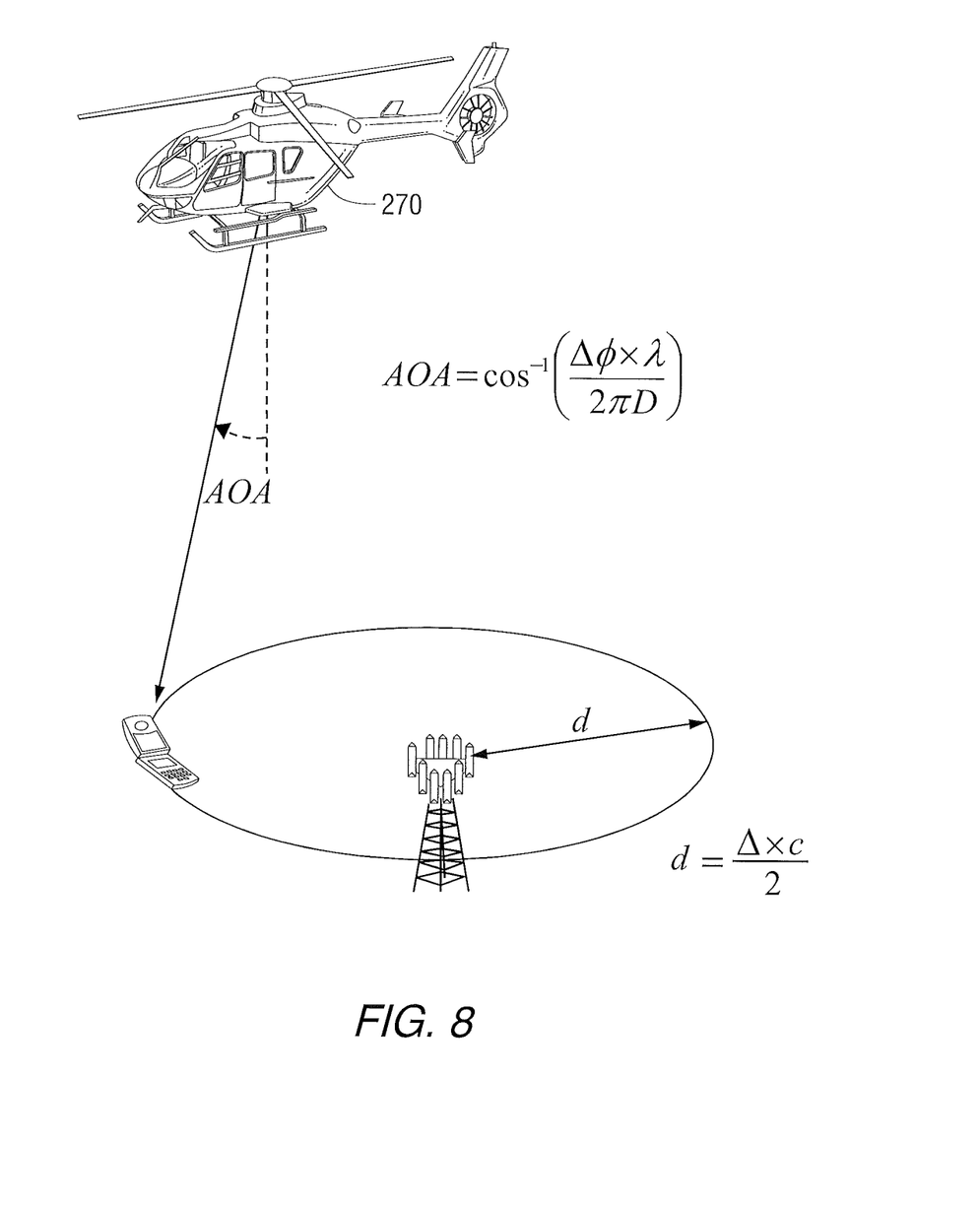
FIG. 8 is a schematic representation of cellular user equipment location.

In addition, active direction finding (DF) can be implemented at the receiver to determine the angle-of-arrival (AoA) of user equipment within the cell. These active DF measurements can be used either by themselves or in combination with other location measurements, such as the range between the base station and the transmitter of interest, to locate the transmitter of interest. This location concept is illustrated in FIGS. 7 and 8.

In one application, a relatively strong pilot signal is transmitted from a base station (BS). A beam of an antenna array on the receiver is adaptively steered in the direction of the base station using this pilot signal as a reference. Beamforming is performed by a beamforming unit (BFU), with the beamforming weights determined by an adaptive weighting computer. Using known signal processing techniques, such as diagonal-loading of a covariance matrix, the width of the beam is subsequently adjusted to cover an area of interest that includes not only the base station, but may also include the user equipment in the cell of interest.

The spatial response pattern of the antenna array not only provides increased gain in the direction of the cell of interest, but also provides attenuation of signals outside the cell of interest. By providing attenuation in directions outside the cell of interest, a large amount of interference will be reduced in strength, which increases the signal-to-noise-plus-interference ratio (SNIR) at the receiver.

In general, however, there will also be sources of interference that will be within the main beam of the antenna pattern, such as cellular users from other cellular systems. These interferers may not be attenuated by the spatial response pattern. Moreover, within any CDMA-based cellular system, due to the nature of CDMA in that all devices in a cell share the same frequency and time, every CDMA cellular device with a cell is an interferer to all other cellular devices in the same cell. It is desirable, then, to receive and decode all signals within the cell of interest. This can be achieved by implementing known signal characterization techniques that are not part of this invention, while utilizing standard waveform definitions published by relevant standards bodies such as IEEE and 3GPP.

The receiver that is the subject of one embodiment of this invention includes multiple receiver functions, or modems, which can acquire, track and decode those standardized waveforms, essentially performing the same receiver function as a conventional cellular receiver. Thus, not only will the signals of interest in the cellular system of interest be received and decoded, but a plurality of standard signals present within the cell of interest may also be received and decoded. Once each signal is decoded to determine the bit or symbol values within each signal, again, using conventional cellular receiver functions, each signal as it appeared when it was transmitted from its source can be reconstructed, essentially using the same transmit function as a conventional cellular transmitter. Each reconstructed signal is then provided to an active cancellation process, where adaptive finite impulse response (FIR) filters automatically recreate each interfering signal's propagation delay and channel distortion, and automatically adjust the gain of the reconstructed signal, to cancel the interference caused by each of these signals at the receiver, thereby reducing the impact of these interfering signals in the SNIR of the signals of interest.

In another application, when it is desirable to focus the array beam on a particular user within the cell, the beam is adaptively steered in the direction of this user. In this instance, the pilot signal of user equipment is used as a reference.

Figure 2:
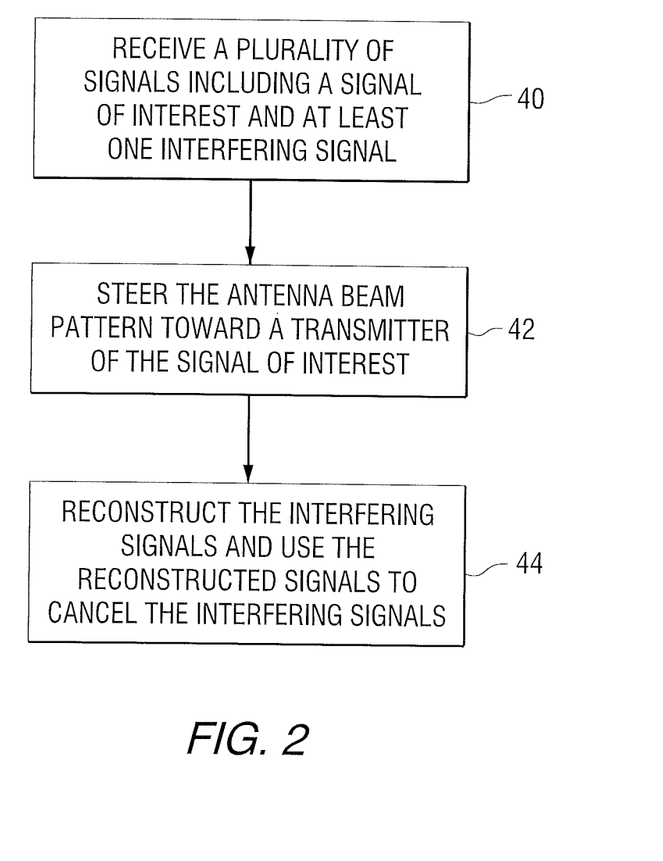
FIG. 2 is a flow diagram that shows the beam steering method used in an embodiment of the invention.

FIG. 2 is a flow diagram that shows the signal processing method used in an embodiment of the invention. The array of antenna elements in receiver 18 of FIG. 1 is used to receive a plurality of signals including a signal of interest and at least one interfering signal, as shown in block 40. Then the processing circuitry selects the signal of interest and steers the antenna beam pattern toward a transmitter of the signal of interest (block 42). The receiver processing circuitry also reconstructs the interfering signal(s) and uses the reconstructed interfering signals to cancel the interfering signals that enter the receiver from the signal space (block 44). As used in this description, "signal space" means the collective sum of all electromagnetic energy impinging on the antenna array.

Figure 3A:
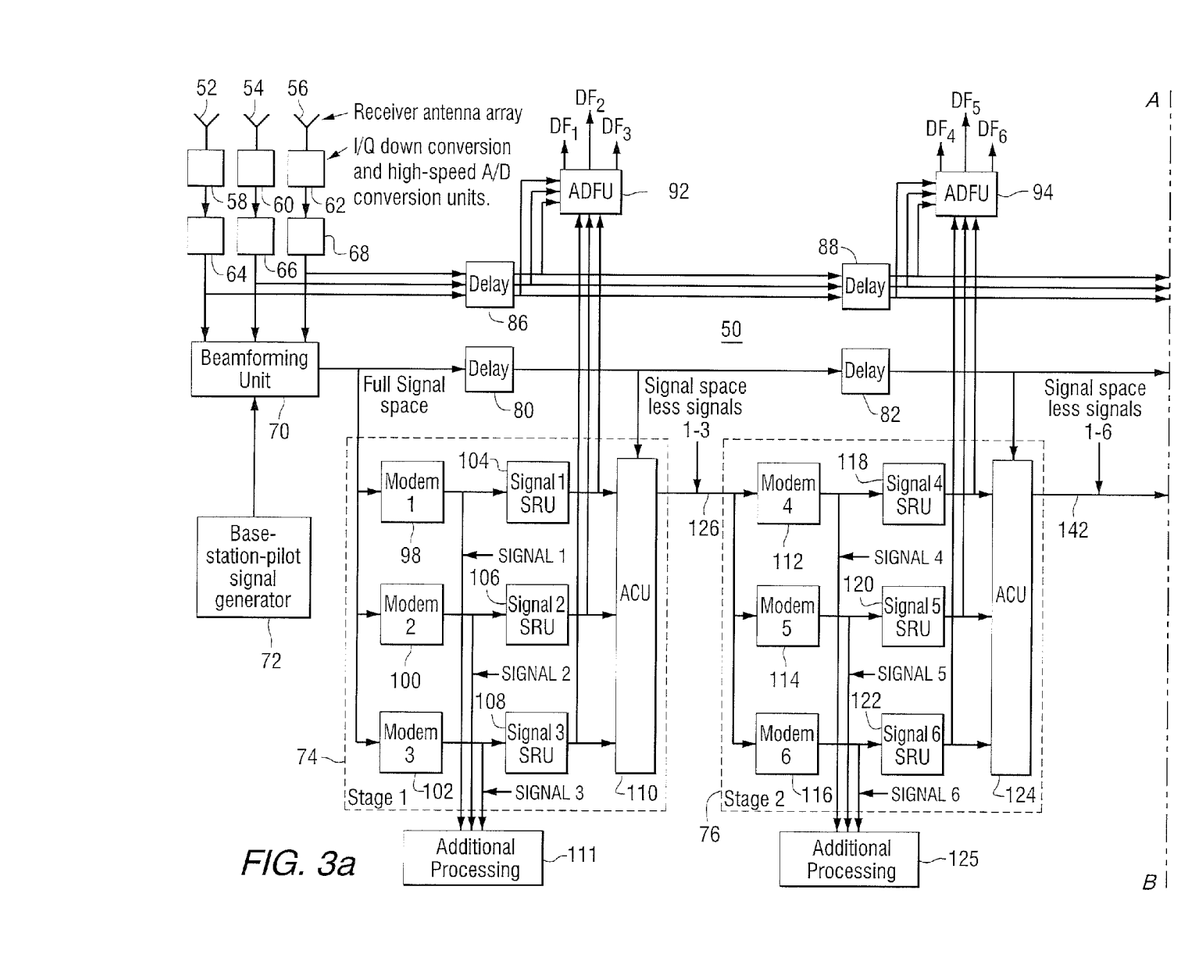
FIGS. 3a and 3b show a block diagram of the relevant portions of a cellular telephone constructed in accordance with an embodiment of the invention.
Figure 3B:
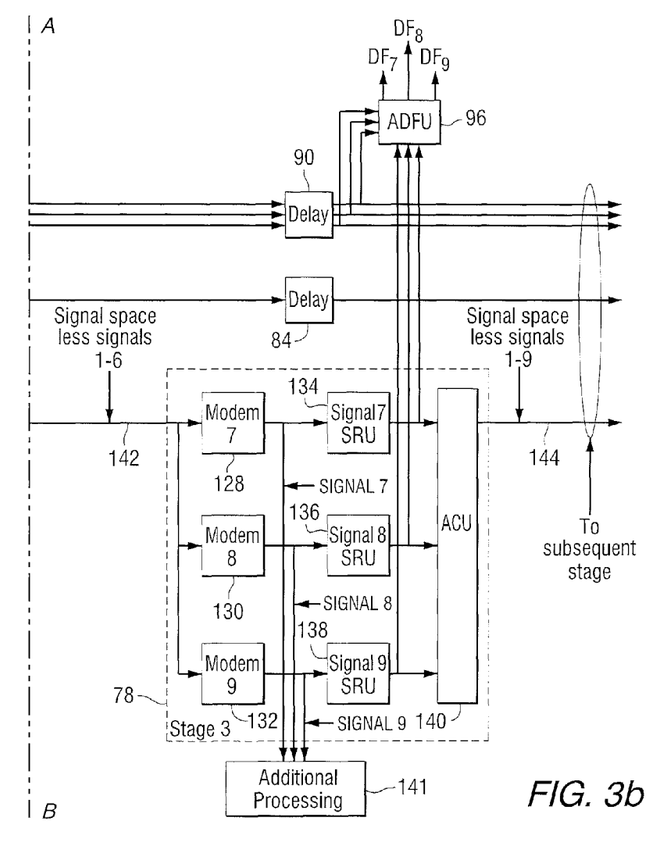
Figure 6:
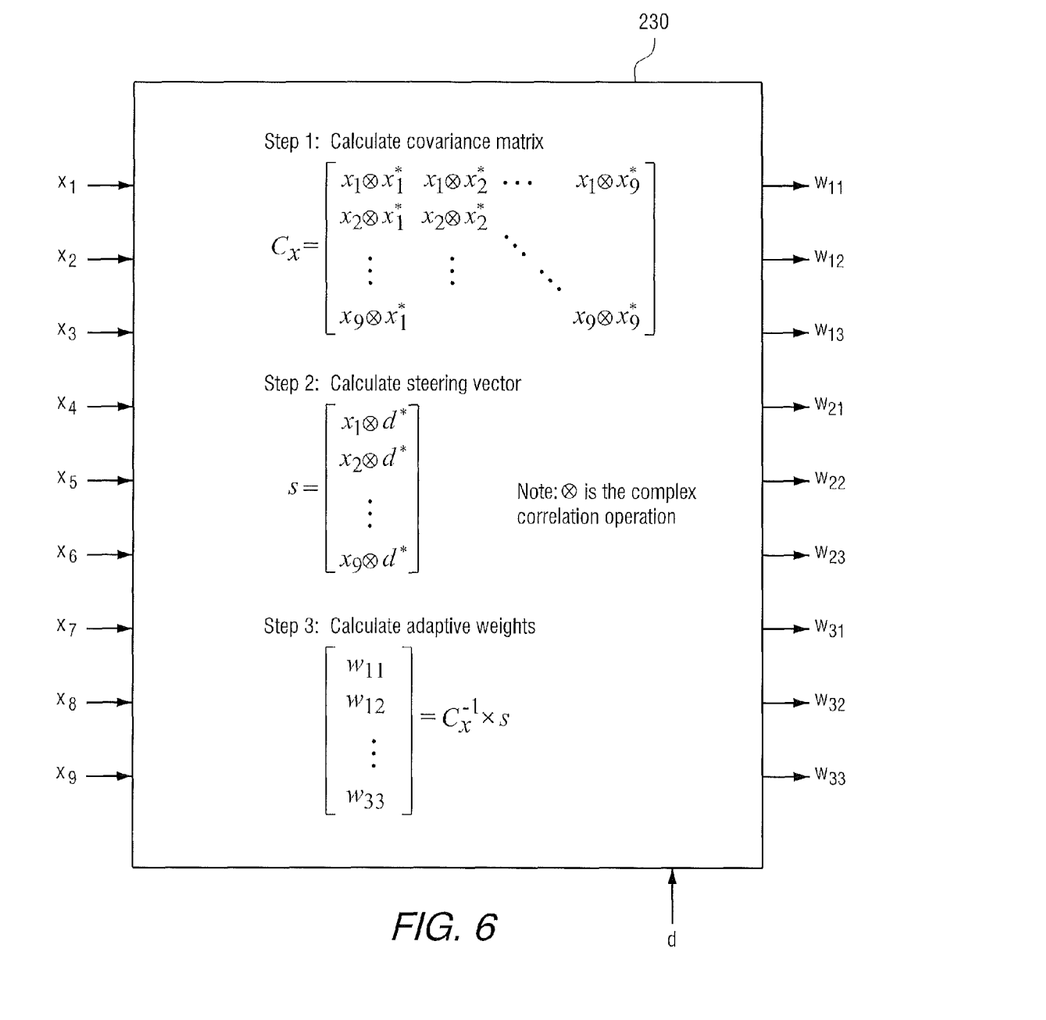
FIG. 6 is a block diagram of an adaptive weighting computer.

FIGS. 3a and 3b show a block diagram of portions of a receiver 50 constructed in accordance with an embodiment of the invention. Each antenna element 52, 54 and 56 will feed an I/Q downconverter 58, 60 and 62 that is followed by a high-speed analog to digital converter (ADC) 64, 66 and 68. The output of each ADC will be sent to the beamforming unit (BFU) 70, which exploits the base station pilot signal to adaptively combine the output of each ADC to provide spatial gain in the direction of the cell of interest. Weighting for the BFU is performed by an adaptive weighting computer, which accepts the locally generated base station pilot signal as the desired signal d. One example of an adaptive weighting computer that can be used for this purpose is shown in FIG. 6.

The receiver of FIG. 3 also includes a base station pilot generator 72; a plurality of signal processing stages 74, 76 and 78; delay elements 80, 82, 84, 86, 88 and 90; and active direction finding units 92, 94 and 96.

Figure 4:
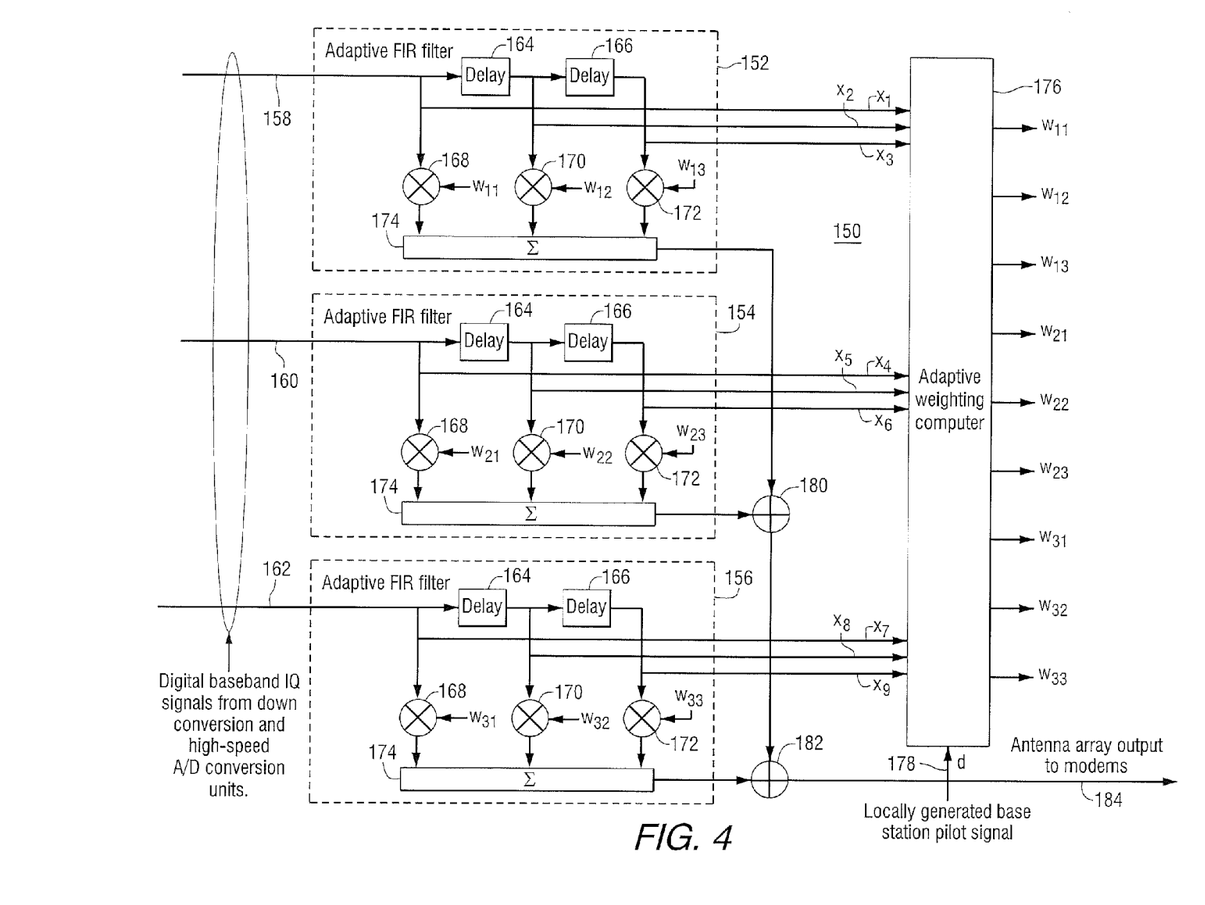
FIG. 4 is a block diagram of a beamforming unit.

In FIG. 3a, the pilot signal comes into play in the beamforming unit 70. This is mentioned above and below, and is explicitly illustrated in FIG. 4. In FIG. 4, desired signal "d" takes the role of the pilot signal, and is used by the adaptive weighting computer, illustrated in detail in FIG. 6. Note that the adaptive weighting computer is used by both the beamforming unit and the active cancellation unit, but only in the beamforming application is the signal "d" equivalent to the locally generated pilot signal. In the cancellation application, "d" is equivalent to the output of the canceller. The pilot signal does not come into play in FIG. 5 or in FIG. 7. One skilled in the art would recognize all of the modems in FIGS. 3a and 3b would use training or pilot signals for standard modem receiver functions, such as channel estimation and carrier recovery, but this does not relate to the subject of the invention.

Within the cell of interest, some of the signals will be substantially stronger than others, and it will be possible to decode these signals to a sufficient quality (wherein the signal quality can be defined as a specified bit error rate, for example) even in the presence of all the other interfering signals. These high-signal-strength signals can be processed by stage 1 of the receiver, in which no cancellation of interfering signals within the cell takes place. Stage 1 includes a plurality of modems 98, 100 and 102; a plurality of signal reconstruction units (SRU's) 104, 106 and 108; and an active cancellation unit 110. This ACU removes reconstructed signals 1, 2, and 3 from the signal space in preparation for stage 2 processing. The decoded bit streams from the modems can then be processed by additional circuitry, as illustrated in block 111, using well-known technology to produce a receiver output.

Another class of signals will have lower signal strength, and it will be possible to decode these signals to a desired quality only if the high-signal-strength signals are removed from the signal space before decoding is attempted. These "medium-signal-strength" signals will be processed by stage 2 of the receiver, in which active cancellation is used first to remove the high-signal-strength signals from the signal space. Stage 2 includes a plurality of modems 112, 114 and 116; a plurality of signal reconstruction units (SRU's) 118, 120 and 122; and an active cancellation unit 124. The decoded bit streams from the modems can then be processed by additional circuitry, as illustrated in block 125, using well-known technology to produce a receiver output.

In order to achieve the desired result, the active cancellation unit (ACU) of stage 2 will need high-resolution locally generated replicas of the baseband I/Q forms of the signals that were decoded in stage 1. This is provided by the signal reconstruction units (SRU) of stage 1, which take the bit or symbol values provided by the stage 1 modems and essentially perform the standard transmit function of a cellular transmitter. The ACU will receive the signal space out of the beamforming unit, adaptively weight the signal replicas provided by stage 1, and subtract these weighted replicas from the original signal space, resulting in a stage 2 signal space on line 126 in which the high-signal-strength signals in the cell of interest have been removed. Since these stage 1 signals are no longer in the signal space processed by the stage 2 modems, they cannot interfere with the medium-strength signals that are being processed by the stage 2 modems, and the medium-strength signals can now be decoded to the desired quality.

Conceptually, there could be a third category of signals whose strength is so low that they can only be decoded to the desired signal quality after removing all stage 1 and stage 2 signals from the signals space. This would be achieved by an ACU in a third stage, which takes the signal space from which the stage 1 signals were removed, and then removes the stage 2 signals by using high-resolution locally generated replicas of the baseband I/Q forms of these signals provided by stage two SRUs. In the example of FIG. 3, stage 3 includes a plurality of modems 128, 130 and 132; a plurality of signal reconstruction units (SRU's) 134, 136 and 138; and an active cancellation unit 140. Stage 3 receives signals on line 142 and produces signals on line 144. The decoded bit streams from the modems can then be processed by additional circuitry, as illustrated in block 141, using well-known technology to produce a receiver output.

Although three stages of the receiver are described, the number of stages that could be implemented in the receiver is unlimited, and can be adjusted to accommodate different mixes of signal strengths amongst the signals within the cell. For example, the signals on line 144 can serve as the input to another stage.

The strong signals would naturally get detected first, by stage 1. After these strong signals are removed from the signal space, the next-strongest signals would naturally get detected next, by stage 2, and so on. Normally in a cellular system, each modem is constantly scanning the signal space for all possible signals within its cellular system. If it detects a signal, it will likely be able to decode that signal with sufficient quality because if the signal quality isn't high enough to decode, the signal probably wouldn't have been strong enough to detect. Signals that can be detected by the modems in stage 1, therefore, will by their very nature be the strongest ones. If they were weaker, the stage 1 modems, which see the entire signal space before any signals are cancelled from it, would not detect them. Once the strongest signals have been removed from the signal space, the same principle applies to stage 2. If a signal is strong enough to decode in stage 2, it will probably be detected by one of the stage 2 modems. These signals wouldn't have been detected by the stage 1 modems, however, because in the presence of the entire signal space, including the strong signals that were decoded and removed by stage 1, they are relatively too weak to detect. In addition to this natural scheme, there could be a provision for pushing signals from one stage to a modem in a subsequent stage down the chain, if for some reason extra-high quality is needed on that signal. A common measure of signal quality that could be used as a metric for this feature is bit error rate.

FIG. 4 is a block diagram of a beamforming unit 150. The beamforming unit includes a plurality of finite impulse response filters 152, 154 and 156. These filters receive digital baseband I/Q digital signals from the down conversion and the A/D conversion units on lines 158, 160 and 162. Each of the filters includes delay elements 164 and 166, multipliers 168, 170 and 172, and a summer 174. The filter input signals $x_1$, $x_4$ and $x_7$ are passed to an adaptive weighting computer 176, along with delayed version of the input signals $x_2$, $x_3$, $x_5$, $x_6$, $x_8$ and $x_9$. The adaptive weighting computer receives a locally generated base station pilot signal on line 178 as the desired reference signal d, and produces weighting coefficients $w_{11}$, $w_{12}$, $w_{13}$, $w_{21}$, $w_{22}$, $w_{23}$, $w_{31}$, $w_{32}$ and $w_{33}$. These weighting coefficients serve as inputs to the multipliers in the filters as illustrated in FIG. 4. The filters multiply the digital signals and the weighting coefficients to produce weighted digital signals, and sum the weighted digital signals. The outputs of the filters are added in adders 180 and 182 to form the antenna array output on line 184. Further details of the adaptive weighting computer are shown in FIG. 8.

Figure 5:
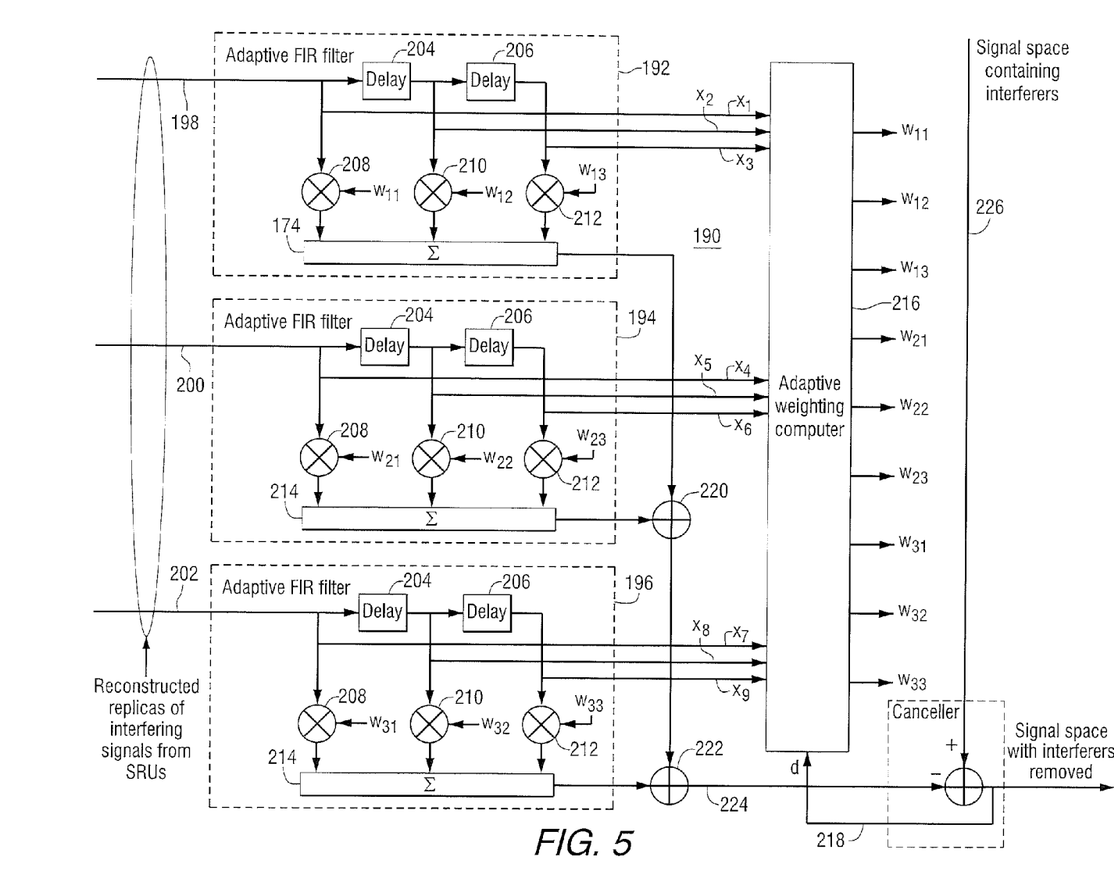
FIG. 5 is a block diagram of an active cancellation unit.

FIG. 5 is a block diagram of an active cancellation unit 190. The active cancellation unit includes a plurality of finite impulse response filters 192, 194 and 196. Each of these filters receives the digital baseband I/Q digital representation of one of the signals to be cancelled from the corresponding SRU on lines 198, 200 and 202. Each of the filters includes delay elements 204 and 206, multipliers 208, 210 and 212, and a summer 214. The filter input signals $x_1$, $x_4$ and $x_7$ are passed to an adaptive weighting computer 216, along with a delayed version of the input signals $x_2$, $x_3$, $x_5$, $x_6$, $x_8$ and $x_9$. The adaptive weighting computer receives the final output of the active cancellation unit as the desired signal d on line 218 and produces weighting coefficients $w_{11}$, $w_{12}$, $w_{13}$, $w_{21}$, $w_{22}$, $w_{23}$, $w_{31}$, $w_{32}$ and $w_{33}$. These weighting coefficients serve as inputs to the multipliers in the filters as illustrated in FIG. 5. The filters multiply the digital signals and the weighting coefficients to produce weighted digital signals, and sum the weighted digital signals. The outputs of the filters are added in adders 220 and 222 to form a signal on line 224, which is subtracted from the signal space containing the interferers on line 226 to produce the final output of the ACU on line 218, which represents the signal space after the interferers have been removed.

FIG. 6 is a block diagram of an adaptive weighting computer 230. The computer receives the signals to be weighted, $x_1$, $x_2$, $x_3$, $x_4$, $x_5$, $x_6$, $x_7$, $x_8$ and $x_9$, and the desired signal d, and produces weights $w_{11}$, $w_{12}$, $w_{13}$, $w_{21}$, $w_{22}$, $w_{23}$, $w_{31}$, $w_{32}$ and $w_{33}$. To produce the weights, the computer calculates the covariance matrix of the signals to be weighted, calculates a steering vector by a complex correlation of the signals to be weighted with the reference signal d, and calculates the adaptive weights as a cross product of the covariance matrix and the steering vector.

Details of the SRU are not provided, as there are known and standard methods for creating the I/Q signal to be transmitted from a symbol or bit stream, and such methods are not the subject of this invention.

Knowing the location of the user equipment (UE) is important for location-based services, as well as for emergency 911 calls. The ability to determine the location of cellular user equipment can be accomplished using a combination of angle-of-arrival (AoA) measurements and range measurements, as illustrated in FIG. 7.

As illustrated in FIG. 7, the Angle-of-Arrival (AoA) of a cellular transmitter can be determined by receiving the transmit signal on two separate antennas 232 and 234 whose positions are known. In FIG. 7, the antennas receive signals $S_1$ and $S_2$, where $S_1$ may represent the signal of interest and $S_2$ may represent interference. By using the reconstructed signal provided by the SRU of the signal of interest, active AoA determination, as opposed to conventional AoA determination of unknown signals, is used. Generally, in active AoA determination, in-phase/quadrature (I/Q) components of the received signals are created by dividing the incoming signals with dividers 236 and 238. Demodulation is performed on the components using a local oscillator 240, a phase shifter 242, multipliers 244, 246, 248 and 250, and analog to digital converters 252 and 254. This provides a baseband complex signal, which is then digitized. The complex baseband digital I/Q signal from each antenna is then correlated with a locally generated replica $S_1$ of the complex signal, using multipliers 256 and 258, and integrators 260 and 262. The result of each correlation is a complex value whose phase is equal to the electrical phase of the signal received at the antenna. The difference between the phases at the two antennas can be used to determine AoA.

The determination of the range from the user equipment to the base station takes advantage of the fact that in most standard cellular systems the timing of the user equipment's uplink transmission is controlled in some way by its base station. In TDMA systems, the user equipment's uplink transmission is delayed or advanced in response to commands from the base station so that all uplink signals in the cell arrive at the base station in a synchronized fashion. This delay can be converted to distance by applying the following relationship:

$$d = d_{MAX} - \frac{\Delta \times c}{2}$$

where d is the distance between the user equipment and its base station, $d_{MAX}$ is the diameter of the cell, which is available through published cellular planning records and standards documentation, $\Delta$ is the delay that the base station tells the user equipment to apply to its uplink transmission, and c is the speed of light.

In CDMA systems, the user equipment's uplink transmission is synchronized in the user equipment to the base station's downlink reference. This limits the size of the search window that the base station has to use in acquiring the user equipment's uplink. By observing the offset between the base station's downlink reference and the user equipment's uplink signal, the distance between the user equipment and its base station can be determined using the following relationship:

$$d = \frac{\Delta \times c}{2}$$

where d is the distance between the user equipment and its base station, $\Delta$ is the offset between the base station's downlink reference and the user equipment's uplink signal, and c is the speed of light. UE location through the combination of AOA and range measurements is illustrated in FIG. 8, wherein an airborne high-performance cellular receiver is provided in an aircraft 270.

In the embodiment of FIG. 3, the baseband digital I/Q signal from each of the antennas in the array is provided to an active direction finding unit (ADFU) associated with each of the stages of the signal-decoding portion of the receiver. Each ADFU performs the correlation function described above for not only two antennas, but for each of the antennas of the system. This allows multiple phase differences to be calculated, which can then be combined in an optimal fashion using maximal-ratio combining to improve the accuracy of AoA determination beyond what would be achieved using just two antennas. In one embodiment of this invention, the locally generated replicas that are used to perform the correlation process shown in FIG. 7 are provided by the SRUs of the corresponding stage of the signal-decoding portion of the receiver. Due to the active cancellation that is performed at each stage, a high-quality replica is available for performing direction finding on all signals within the cell of interest, even the low-signal-strength signals.

The difference in phase between the two antennas' complex waveforms is translated into AoA as defined in FIG. 7 using the following relationship, which is known to those versed in the art:

$$AOA = \sin^{-1}\left(\frac{\Delta\phi \times \lambda}{2\pi D}\right)$$

where $\Delta\phi$ is the complex phase difference between the two antennas, $\lambda$ is the wavelength of the signal, and D is the distance between the two antenna elements. In general, two-dimensional AoA is required so that both the azimuth and elevation angles-of-arrival can be measured. To achieve this, two antenna pairs are used—one pair oriented horizontally, the other vertically, and the phase difference from each pair is determined as described above.

In another aspect, the invention provides a method including: receiving a reference signal on an array of antenna elements; using a received reference signal to find optimal weighting of the antenna elements to point a beam pattern of the antenna elements in the direction of a reference signal, thereby providing gain in the direction of the reference signal and attenuation in all other directions; adjusting a width of the beam pattern to cover an area of interest; acquiring and tracking interferers in the area of interest; reconstructing a component of interference from each of the interferers; and using the reconstructed component of interference to cancel interference from the received signal space.

A separate receiver process can be executed for reconstructing a component of interference from each of the interferers. Each of the receiver processes can generate a sampled historical representation of a received signal at a sample resolution sufficient to produce a canceling signal. Each receiver process can further include active cancellation.

The method can further include determining the range from a receiver to a base station, and determining an angle-of-arrival of the reference signal. The angle-of-arrival of the reference signal can be determined by receiving the reference signal on two separate antennas whose positions are known; performing I/Q demodulation of the reference signal received on each antenna to produce baseband complex signals; digitizing the baseband complex signals; determining a difference in phase between the baseband complex signals; and calculating the angle-of-arrival using the difference in phase. In addition, the digitized baseband complex signal can be despread using a PN code. Despreading is a standard cellular receiver process that would occur in modems 1-9, however, it is not part of this invention.

This invention enables a wireless commercial communications receiver to receive and decode signals at distances much greater than standard commercial equipment will receive such signals, and to also determine the location of user equipment.

The ability to receive and decode signals at greater-than-standard distances is accomplished by increasing the received signal strength as well as the signal-to-noise-plus-interference ratio (SNIR).

This invention can be implemented in a non-conventional cellular receiver that can operate well outside the normal cellular range, and provides higher performance in terms of range, sensitivity, antenna gain, and data throughput than a conventional hand-held cellular telephone. In addition, the high-performance cellular receiver will, through active direction finding (DF), provide the capability to determine the angle-of-arrival (AoA) of hand-held cellular user equipment operating within the cell of interest. Finally, the high-performance cellular receiver will, through multiple receiver functions and active cancellation, provide simultaneous high-quality copies of all transmitted signals within a cell.

While the invention has been described in terms of several embodiments, it will be apparent to those skilled in the art that various changes can be made to the described embodiments without departing from the scope of the invention as set forth in the following claims.

What is claimed is:

1. A method comprising:
   receiving a reference signal on an array of antenna elements;
   using the received reference signal to find optimal weighting of the antenna elements to point a beam pattern of the antenna elements in the direction of a reference signal, thereby providing gain in the direction of the reference signal and attenuation in all other directions;
   adjusting a width of the beam pattern to cover an area of interest;
   acquiring and tracking interferers in the area of interest;
   reconstructing a component of interference from each of the interferers; and
   using the reconstructed component of interference to adaptively cancel interference from the interferers.

2. The method of claim 1, wherein a separate receiver process is executed for reconstructing a component of interference from each of the interferers.

3. The method of claim 2, wherein each of the receiver processes generates a sampled historical representation of a received signal at a sample resolution sufficient to produce a canceling signal.

4. The method of claim 2, wherein each receiver process utilizes active cancellation.

5. The method of claim 1, further comprising:
   determining the range from a receiver to a base station; and
   determining an angle-of-arrival of the reference signal.

6. The method of claim 5, wherein the angle-of-arrival of the reference signal is determined by receiving the reference signal on two separate antennas whose positions are known;
   performing I/Q demodulation of the reference signal received on each antenna to produce baseband complex signals;
   digitizing the baseband complex signals;
   determining a difference in phase between the baseband complex signals; and
   calculating the angle-of-arrival using the difference in phase.

7. A receiver comprising:
   an array of antenna elements for receiving a reference signal; and
   processing circuitry for using the received reference signal to find optimal weighting of the antenna elements to point a beam pattern of the antenna elements in the direction of a reference signal, thereby providing gain in the direction of the reference signal and attenuation in all other directions; for adjusting a width of the beam pattern to cover an area of interest; for acquiring and tracking interferers in the area of interest; for reconstructing a component of interference from each of the interferers; and for using the reconstructed component of interference to adaptively cancel interference from the interferers.

8. The receiver of claim 7, wherein the processing circuitry executes a separate process for reconstructing a component of interference from each of the interferers.

9. The method of claim 8, wherein each of the separate processes generates a sampled historical representation of a received signal at a sample resolution sufficient to produce a canceling signal.

10. The receiver of claim 8, wherein each of the separate processes utilizes active cancellation.

11. The receiver of claim 7, wherein the processing circuitry determines a range from a receiver to a base station and determines an angle-of-arrival of the reference signal.

12. The receiver of claim 11, wherein the processing circuitry determines the angle-of-arrival of the reference signal by receiving the reference signal on two separate antennas whose positions are known;
   performs I/Q demodulation of the reference signal received on each antenna to produce baseband complex signals;
   digitizes the baseband complex signals;
   determines a difference in phase between the baseband complex signals; and
   calculates the angle-of-arrival using the difference in phase.

* * * * *